US012709000B2

(12) United States Patent
Forbrigger et al.

(10) Patent No.: US 12,709,000 B2
(45) Date of Patent: Aug. 18, 2026

(54) MAGNETIC TORSION SPRING FOR A MAGNETICALLY ACTUATED MECHANISM AND METHOD FOR FORMING THE SPRING

(71) Applicant: The Governing Council of the University of Toronto, Toronto (CA)

(72) Inventors: Cameron Forbrigger, Hatchet Lake (CA); Adam Schonewille, Aldergrove (CA); Eric Diller, York (CA)

(73) Assignee: The Governing Council of the University of Toronto, Toronto (CA)

( * ) Notice: Subject to any disclaimer, the term of this patent is extended or adjusted under 35 U.S.C. 154(b) by 0 days.

(21) Appl. No.: 18/563,695

(22) PCT Filed: May 26, 2022

(86) PCT No.: PCT/CA2022/050842
§ 371 (c)(1),
(2) Date: Nov. 22, 2023

(87) PCT Pub. No.: WO2022/246560
PCT Pub. Date: Dec. 1, 2022

(65) Prior Publication Data

US 2024/0238963 A1 Jul. 18, 2024

Related U.S. Application Data

(60) Provisional application No. 63/193,289, filed on May 26, 2021.

(51) Int. Cl.
*B25J 9/10* (2006.01)

(52) U.S. Cl.
CPC .................................... *B25J 9/106* (2013.01)

(58) Field of Classification Search
CPC ........ B25J 9/106; B25J 17/0241; B25J 9/126; F16F 6/00; F16F 6/005
See application file for complete search history.

(56) References Cited

FOREIGN PATENT DOCUMENTS

| | | | |
|---|---|---|---|
| CA | 2 444 811 | A1 | 11/2002 |
| CN | 204399462 | U | 6/2015 |
| CN | 106907417 | A | 6/2017 |
| DE | 1590734 | A1 | 5/1970 |
| DE | 1615789 | A1 | 8/1970 |

(Continued)

OTHER PUBLICATIONS

Choi et al., "Design of a Robot Joint with Variable Stiffness," 2008 International Conference on Robotics and Automation, Pasadena, CA, May 19-23, 2008. (6 pages) (Year: 2008).*

(Continued)

*Primary Examiner* — Gregory Robert Weber

(57) ABSTRACT

A magnetic torsion spring for a magnetically actuated mechanism, the spring having first and second links of the mechanism rotatably connected at a joint of the mechanism, the first link provided with a first magnet spaced from the joint and the second link provided with a second magnet spaced from the joint generating a spring effect, the spring defined by a torque curve with respect to spring deflection, the torque curve defined by spring type, dimensionless characteristic length ratio of the spring, and an amplitude constant, and the length ratio has a value between 0 and 1.

24 Claims, 7 Drawing Sheets
(6 of 7 Drawing Sheet(s) Filed in Color)

(56) References Cited

FOREIGN PATENT DOCUMENTS

| | | | |
|---|---|---|---|
| DE | 198 29 881 | A1 | 1/2000 |
| EP | 0 127 741 | A1 | 12/1984 |
| JP | 61-52435 | A | 3/1986 |
| JP | 1-199029 | A | 8/1989 |
| JP | 1-224539 | A | 9/1989 |
| JP | 2719919 | B2 | 11/1997 |
| WO | 2009/006888 | A2 | 1/2009 |
| WO | 2018/026344 | A1 | 2/2018 |

OTHER PUBLICATIONS

Sudano et al., "A Resonant Parallel Elastic Actuator for Biorobotic Applications," IEEE/RSJ International Conference on Intelligent Robots and Systems (IROS) :2815-2820, 2014. (6 pages) (Year: 2014).*

International Search Report and Written Opinion of the International Searching Authority, mailed Sep. 2, 2022, for International Application No. PCT/CA2022/050842, 8 pages.

Aman et al., "Optimal Parametric Design of Radial Magnetic Torque Couplers via Dimensional Analysis," *IEEE Transactions on Magnetics* 58(6):4900108, Jun. 2022. (8 pages).

Choi et al., "Design of a Robot Joint with Variable Stiffness," *2008 International Conference on Robotics and Automation*, Pasadena, CA, May 19-23, 2008. (6 pages).

Hoang et al., "Untethered Robotic Motion and Rotating Blade Mechanism for Actively Locomotive Biopsy Capsule Endoscope," *IEEE Access 7*:93364-93374, 2019.

Kanj et al., "Design, dynamics, and dissipation of a torsional-magnetic spring mechanism," *Mechanical Systems and Signal Processing 179*: 109307, 2022. (16 pages).

Lim et al., "Design and Comparison of Magnetically-Actuated Dexterous Forceps Instruments for Neuroendoscopy," *IEEE Transactions on Biomedical Engineering*, Jun. 2020. (11 pages).

Simi et al., "Magnetic Torsion Spring Mechanism for a Wireless Biopsy Capsule," *Journal of Medical Devices* 7(4):041009, 2013. (12 pages).

Sudano et al., "Design, Development and Scaling Analysis of a Variable Stiffness Magnetic Torsion Spring," *Int. J. Adv. Robot. Syst.* 10(372), 2013. (11 pages).

Sudano et al., "A Resonant Parallel Elastic Actuator for Biorobotic Applications," *IEEE/RSJ International Conference on Intelligent Robots and Systems* (*IROS*):2815-2820, 2014. (6 pages).

Woodward et al., "Universal Custom Complex Magnetic Spring Design Methodology," *IEEE Transactions on Magnetics* 54(1):8200213, Jan. 2018. (13 pages).

Woodward et al., "Tailored Magnetic Springs for Shape-Memory Alloy Actuated Mechanisms in Miniature Robots," *IEEE Transactions on Robotics* 35(3):589-601, Jun. 2019.

Zheng et al., "Analytical study of a quasi-zero stiffness coupling using a torsion magnetic spring with negative stiffness," *Mechanical Systems and Signal Processing 100*:135-151, 2018.

* cited by examiner

MAGNETIC TORSION SPRING FOR A MAGNETICALLY ACTUATED MECHANISM AND METHOD FOR FORMING THE SPRING

BACKGROUND

Technical Field

The present disclosure relates to miniature torsion springs and actuators for small-scale magnetically actuated mechanisms such as robots.

Discussion of the Related Art

Magnetic fields can penetrate physical barriers to apply forces and torques wirelessly to magnetic robotic devices in small confined environments. Magnetic robots show superior precision, directionality, and control complexity compared to other small-scale actuation methods, which makes magnetic devices an attractive engineering solution to a variety of challenges in biomedical applications and in the area of small scale mechanisms more broadly.

Robotic devices sometimes incorporate magnets to store energy or provide restoring forces in place of or complementing elastic springs. Energy storage is crucial for some methods of robot locomotion, and nonlinear restoring torque is necessary for mimicking biological locomotion patterns. Unlike elastic springs, magnetic springs experience no fatigue and very little wear. Magnetic rectilinear springs have been custom-tailored to produce nonlinear force-displacement relationships for specific actuation methods, and variable stiffness torsion springs have been designed for human-scale robots and mechanisms using magnetic interaction. The benefits of magnetic torsion springs for energy storage have been demonstrated in centimeter-scale capsule robots for biopsy in the gastrointestinal tract. Magnetic interaction scales with decreasing distance between magnets, so magnetic springs are applicable to small-scale robots.

Millimeter-scale magnetically-actuated robot manipulators for tasks in confined environments have been developed with elastic compliant joints composed of thin nickel-titanium wires. The restoring torque provided by the elastic joints allows the gripping and wrist actuation to be decoupled and controlled independently. However, these elastic joints have some disadvantages. Buckling makes it difficult to predict the motion of the manipulators or apply directed forces, and such simple elastic springs are limited to a single stable position, which can limit the available gripping or prying strength. Rigid pin joints could solve the buckling problem, but they do not provide the restoring torques that are critical to the control of the robot.

Small-scale robots are a strong candidate for magnetic torsion springs, but existing magnetic torsion spring designs consist of multiple magnets mounted concentrically or mounted on concentric rings, which makes them difficult to assemble on a scale below 10 mm. Further, most of these designs are only capable of producing sinusoid-like stiffness responses with only one stable equilibrium and one unstable equilibrium. In addition, most of these existing torsion springs are not compatible with magnetic actuation. Prior art designs are limited to the following cases: (a) bistable mechanisms with two stable points roughly 180 degrees apart from each other; (b) a spring constant whose stiffness magnitude can be set, but whose stiffness profile (how the stiffness changes as the joint rotates) cannot be controlled precisely.

BRIEF SUMMARY

Magnetic robots already have magnets for actuation purposes, but embedded magnets in the links can be tailored to produce desirable spring torque-displacement relationships.

The present disclosure enables a variety of customizable torsional stiffness responses for pin joints in miniature devices (on the centimeter scale or smaller) while also enabling the wireless actuation of the pin joint with an external magnetic field source. The disclosure comprises magnetic material embedded in adjacent links that are connected by a pin joint. The stiffness function of the spring and its susceptibility to magnetic actuation can be adjusted by designing the size, position, and orientation of the magnetic material in each link.

According to a first broad aspect, there is provided a magnetic torsion spring for a magnetically actuated mechanism, the spring comprising first and second links of the mechanism rotatably connected at a joint of the mechanism; wherein the first link is provided with a first magnet spaced from the joint and the second link is provided with a second magnet spaced from the joint generating a spring effect; wherein the spring is defined by a torque curve with respect to spring deflection, the torque curve defined by spring type, dimensionless characteristic length ratio of the spring, and an amplitude constant; and the length ratio has a value between 0 and 1.

In some exemplary embodiments of the first broad aspect, the mechanism is a robot. The mechanism may have a size less than 1 cm, and most preferably less than or equal to 5 mm. The spring is preferably wirelessly actuatable by an external magnetic field source. The spring type is preferably selected from the group consisting of diagonal, off-diagonal, z-z, and θ-θ spring types.

In some exemplary embodiments, the joint is a revolute joint, although it will be clear to those skilled in the art that other suitable joint types may be used. The first and second magnets are preferably uniformly magnetized. Further, the first and second magnets are preferably configured for use in actuation of the magnetically actuated mechanism.

According to a second broad aspect, there is provided a magnetically actuated mechanism, the mechanism comprising: a first magnetic torsion spring comprising first and second links of the mechanism rotatably connected at a first joint of the mechanism, wherein the first link is provided with a first magnet spaced from the first joint and the second link is provided with a second magnet spaced from the first joint generating a first spring effect; and a second magnetic torsion spring comprising a third link of the mechanism rotatably connected to the second link at a second joint of the mechanism, wherein the third link is provided with a third magnet spaced from the second joint generating a second spring effect; wherein each of the springs is defined by a torque curve with respect to spring deflection, the torque curve defined by spring type, dimensionless characteristic length ratio of the spring, and an amplitude constant; and the length ratio has a value between 0 and 1.

In some exemplary embodiments, the mechanism is a robot. The mechanism may have a size less than or equal to 5 mm.

Each of the springs is preferably wirelessly actuatable by an external magnetic field source. The spring type may be selected from the group consisting of diagonal, off-diagonal, z-z, and θ-θ spring types.

In some exemplary embodiments, the first joint and the second joint are revolute joints. The first joint may have a first joint axis of rotation parallel to a second joint axis of the second joint, or the first joint may have a first joint axis of rotation non-parallel to a second joint axis of the second joint. The first, second and third magnets are preferably uniformly magnetized. Further, the first, second and third magnets may be configured for use in actuation of the magnetically actuated mechanism.

According to a third broad aspect, there is provided a method for forming a magnetic torsion spring having a desired torque-displacement response for a magnetically actuatable mechanism, the spring comprising first and second links of the mechanism rotatably connected at a joint of the mechanism, comprising:

a. providing first and second magnets for positioning on the first and second links, respectively;
b. determining a desired magnetic actuation response;
c. selecting a spring type based on the desired magnetic actuation response;
d. determining a torque curve reflective of the desired torque-displacement response;
e. selecting a dimensionless parameter length ratio to achieve the shape of the desired torque-displacement response;
f. selecting an amplitude constant to achieve an amplitude of the desired torque-displacement response; and
g. positioning the first and second magnets on the first and second links, respectively, using the spring geometry, each of the first and second magnets spaced from the joint, and the length ratio having a value between 0 and 1, generating a spring effect.

In some exemplary embodiments of the third broad aspect, the spring type is selected from the group consisting of diagonal, off-diagonal, z-z, and θ-θ spring types. The spring is preferably wirelessly actuatable by an external magnetic field source.

In some exemplary embodiments, the joint is a revolute joint. The first and second magnets are preferably uniformly magnetized. Further, the first and second magnets may be configured for use in actuation of the magnetically actuatable mechanism.

A detailed description of exemplary embodiments is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the accompanying drawings, which illustrate exemplary embodiments.

Exemplary embodiments will now be described with reference to the accompanying drawings.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. The following description of examples is not intended to be exhaustive or to limit the invention to the precise form of any exemplary embodiment. Accordingly, the description and drawings are to be regarded in an illustrative, rather than a restrictive, sense.

Figure 1:
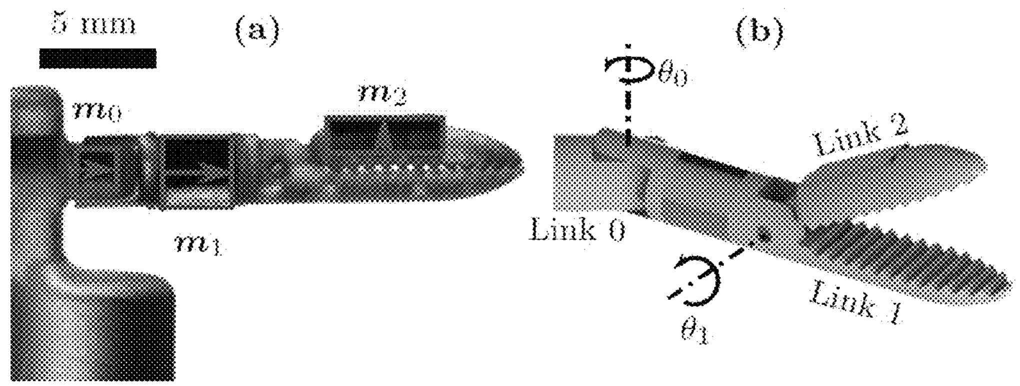
FIG. 1 shows (a) photograph of an exemplary robot designed with magnetic torsion springs showing the locations and magnetization of the integrated magnets, and (b) render of the robot CAD model showing its degrees of freedom.

The present disclosure is directed to a magnetic torsion spring design with customizable torque-deflection responses for small-scale (preferably but not necessarily limited to ≤5 mm diameter) magnetically-actuated mechanisms such as robots. Following is a description of an exemplary embodiment wherein two-magnet systems embedded in the mechanism links may produce useful torque-displacement relationships in a compact assembly by integrating these springs into the design of an exemplary magnetic robot as shown in FIG. 1. In addition, it is shown how a simple point dipole model may be used to model the behavior of these magnetic torsion springs with sufficient accuracy to allow rapid design concept exploration without relying on more computationally-heavy finite element methods.

Analytical Model

The below model is used to define the geometry of magnetic torsion springs, enable the prediction of their behavior, and give insights into how their performance scales with their size. Turning now to FIG. 1, a photograph (FIG. 1(*a*)) is provided of the robot designed with magnetic torsion springs showing the locations and magnetization of the integrated magnets. FIG. 1(*b*) is a rendering of the robot CAD model showing its degrees of freedom.

The model is useful for mechanisms (serial or parallel) with revolute joints and a single embedded magnet in each link, and it assumes that magnetic interactions between nonadjacent links are negligible. In addition, the analytical model was formulated using the point dipole assumption, which assumes that a volume of magnetic material V with a uniform magnetization M can be represented by a vector quantity m with magnitude m=MV located at the center of volume of the material, which simplifies the equations for magnetic fields, forces, and torques. The point dipole assumption is valid when the dimensions of magnetic objects are relatively small compared to the distances between the magnetic objects. This assumption may not be valid for some designs, but it simplifies the geometry sufficiently to allow for rapid exploration of the design space before refinement of the design with finite element models. Although revolute joints are used in the model and design example set forth herein, it will be clear to those skilled in the art informed by the within teaching that other joint types may be suitable with certain exemplary embodiments, such as for non-limiting examples translational/prismatic joints, screw joints and spherical joints. Further, while uniform magnetization of the magnets on the links is described herein with respect to the model and design example, those skilled in the art will know based on the within teaching that the magnetization need not be uniform in every exemplary embodiment and may for example be only generally uniform or partially uniform, or exemplary embodiments may be conceivable to the skilled person based on the within teaching where the magnetization is non-uniform.

A. Design Parameters of a Magnetic Torsion Spring

Figure 2:
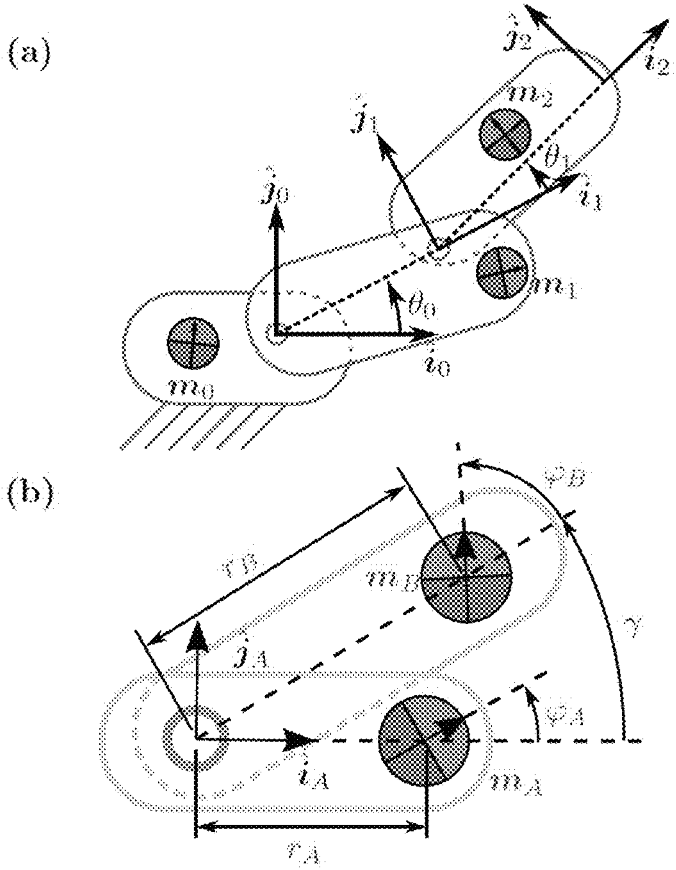
FIG. 2 shows (a) a magnetic serial mechanism with coordinate systems according to the Denavit-Hartenberg convention, and (b) geometry of a magnetic torsion spring between two adjacent mechanism links with the design parameters highlighted in red.

The first step in developing an analytical model is to develop a consistent representation for the geometry of these magnetic interactions. Consider a serial mechanism with three links, each connected with revolute joints, with the first link (link 0) connected to ground as shown in FIG. 2 (*a*). Magnetic material in each link causes intermagnetic forces and torques acting between the links that will vary with the joint angles $\theta_0$ and $\theta_1$. FIG. 2 (*b*) depicts a simplified geometry used to formulate the analytical model of the magnetic torsion spring that accounts for magnetic interaction between two adjacent links A and B. In this model, a right-handed spring coordinate system $[\hat{i}_A, \hat{j}_A, \hat{k}_A]$ is defined such that $k_A$ lies along the rotational axis of the joint and the position of the magnetic point dipole $m_A$ lies along $\hat{i}_A$. The spring deflection $\gamma$ is defined as the angle between the position vectors of the magnets. The torsion spring coordinate system is defined such that the conversion from the joint angle of the $i^{th}$ joint Qi to its spring deflection $\gamma_i$ is simply $\theta_i=\gamma_i+\beta_i$, where $\beta_i$ is some constant angular offset.

The positions of the point dipoles are defined as follows:

$$r_A = r_A\left[1 \quad 0 \quad 0\right]^T, \tag{1}$$

$$r_B = r_B\left[\cos\gamma \quad \sin\gamma \quad 0\right]^T \tag{2}$$

where $r_A$ and $r_B$ are the radial distances from the point dipoles to the rotational axis of the joint. The point dipole vectors are defined as follows:

$$m_A = m_A\left[\cos(\varphi_A) \quad \sin(\varphi_A) \quad 0\right]^T, \tag{3}$$

$$m_B = m_B\left[\cos(\gamma+\varphi_B) \quad \sin(\gamma+\phi_B) \quad 0\right]^T \tag{4}$$

where $\varphi_A$ and $\varphi_B$ describe the orientation of the dipoles relative to the link to which they are fixed, and $m_A$ and $m_B$ represent the dipole magnitudes.

B. Behavior of a Magnetic Torsion Spring

The design criteria for a spring can be specified in terms of its restoring torque $\tau_z$ and stiffness $K_\gamma$. A method for determining these properties for magnetic torsion springs is presented below, and a new quantity called the magnetic sensitivity is introduced.

Analytical expressions for the magnetic force $f_{AB}$ and torque $\tau_{AB}$ on a magnetic dipole $m_B$ due to another magnetic dipole $m_A$ are as follows:

$$\tau_{AB} = \frac{\mu_0 m_A m_B}{4\pi\|r_{AB}\|^3}\hat{m}_B \times \left(3\hat{r}_{AB}\hat{r}_{AB}^T - \mathbb{I}_3\right)\hat{m}_A, \tag{5}$$

$$f_{AB} = \frac{3\mu_0 m_A m_B}{4\pi\|r_{AB}\|^4}\left(\left(\hat{r}_{AB}^T\hat{m}_A\right)\hat{m}_B + \left(\hat{r}_{AB}^T\hat{m}_B\right)\hat{m}_A + \left(\hat{m}_A^T\hat{m}_B - 5\left(\hat{r}_{AB}^T\hat{m}_A\right)\left(\hat{r}_{AB}^T\hat{m}_B\right)\right)\hat{r}_{AB}\right), \tag{6}$$

where $\mu_0$ is the permeability of free space, $r_{AB}=r_B-r_A$, $\times$ denotes the vector cross product, $\|a\|$ denotes the magnitude or 2-norm of the vector a, and $a=a/\|a\|$ denotes a unit vector in the direction of a.

The scalar torque component on link B about the joint rotational axis $\hat{k}_A$ due to the magnetic force and torque acting on $m_B$ can be determined directly from (5) and (6):

$$\tau_Z = \hat{k}_A^T(\tau_{AB} + r_B \times f_{AB}). \tag{7}$$

The joint angular stiffness $K_\gamma$ (N-m/rad) can found from the derivative of $\tau_z$ with respect to $\gamma$.

$$K_\gamma = -\frac{\partial \tau_Z}{\partial \gamma} = \frac{\partial^2 U}{\partial \gamma^2}. \tag{8}$$

Deriving the analytical expression for this derivative may only be tractable for the simplest cases, such as when $r_A=0$ or $r_B=0$. For present purposes, $K_\gamma$ was calculated numerically from the analytical values of $\tau_z$ using a central difference approximation of the derivative.

If link B is to be actuated via magnetic field, a useful property is the magnetic sensitivity $S_m$ (rad/T), which is defined here as $$S_m = \frac{m_B}{K_\gamma}. \tag{9}$$

The magnetic sensitivity describes the angular deflection of link B that results from an applied magnetic field. A higher magnetic sensitivity indicates that larger deflections can be achieved with the same magnetic field. However, if the magnetic sensitivity is too large it may be difficult to achieve accurate small deflections.

C. Dimensional Analysis and Scaling Laws

The behavior of the magnetic torsion spring, described by $\tau_z$ or $K_\gamma$ are functions of six independent variables. From (5)-(8) it follows that $$\tau_Z = f_\tau(\gamma, r_B, r_A + r_B, \varphi_A, \varphi_B, \mu_0 m_A m_B), \tag{10}$$

$$K_\gamma = f_K(\gamma, r_B, r_A + r_B, \varphi_A, \varphi_B, \mu_0 m_A m_B). \tag{11}$$

Dimensional analysis using the Buckingham Pi Theorem allows these equations to be rewritten in a unitless form, such that $$\overline{\tau}_Z = \frac{(r_A + r_B)^3}{\mu_0 m_A m_B}\tau_Z = \phi_\tau(\gamma, \overline{R}, \varphi_A, \varphi_B), \tag{12}$$

$$\overline{K}_\gamma = \frac{(r_A + r_B)^3}{\mu_0 m_A m_B}K_Z = \phi_K(\gamma, \overline{R}, \varphi_A, \varphi_B), \tag{13}$$

where $\overline{\tau}_z$ and $\overline{K}_\gamma$ are the normalized torque and stiffness and $\overline{R}=r_B(r_A+r_B)$ is the characteristic length ratio.

The dimensional analysis reveals that the shape of the torque and stiffness functions with respect to $\gamma$ depends only on $\overline{R}$, $\varphi_A$, and $\varphi_B$; therefore, if a specific joint behavior is desired, such as specific points of equilibrium or constant stiffness, it is only necessary to search over these three dimensionless parameters to find a suitable spring geometry.

Changing the geometric scale of the joint ($r_A+r_B$) or the magnitude of the dipoles ($m_A m_B$) in the joint results only in a vertical scaling of the torque and stiffness functions of the joint. Assuming constant magnetization of the magnets in the torsion spring, and given an isotropic geometric scaling factor L such that $m_A$, $m_B \propto L^3$ and $r_A$, $r_B \propto L$, it can be seen that $\tau_z$, $K_\gamma \propto L^3$ and $S_m \propto L^0$. Notably, the stiffness of an elastic cantilever torsion spring K=EI/l also scales with $L^3$; therefore, elastic torsion springs and magnetic torsion springs should be similarly effective as they are scaled down.

Magnetic Torsion Spring Design Example

The goal of this design example was to create a miniature manipulator with a constant-stiffness wrist joint and a bistable gripping finger thus demonstrating the useful spring behaviors that can be accomplished by magnetic torsion springs within a small envelope. To reduce the scope of the design process, the magnetic actuation design of the manipulator was based on a single-digit magnetic gripper design that used elastic spring joints.

A. Constraints and Criteria

The robot has two revolute joints (wrist and finger) and three magnets: $m_0$, $m_1$, and $m_2$ in the base, the wrist, and the finger, respectively. The wrist magnet $m_1$ serves as the distal magnet $m_B$ for the wrist joint and as the proximal magnet $m_A$ for the finger joint.

The design is subject to several constraints. First, to prove the applicability of these magnetic springs to small scale devices, it was decided that the manipulator must fit through a 5 mm diameter hole or smaller (less than half the size of existing magnetic torsion springs). Second, the available magnetic field generation system is capable of generating field magnitudes up to 20 mT, so it must be possible to actuate both the gripper and wrist simultaneously with less than the maximum available field strength. Third, to prove the simplicity of fabricating these joints, the manipulator must be built with off-the-shelf magnetic components. Fourth, to allow for magnetic actuation according to the selected design, the orientation of the distal wrist magnet must be $\varphi_B=0°$ and the orientation of the distal finger magnet must be $\varphi_B\approx 90°$. Finally, in a serial mechanism of this size it would be difficult to manufacture magnetic springs with an operating deflection range on the same side of the joint ($-90°<\gamma<90°$), so the operating deflection range of both springs is constrained to approximately $900 \leq \gamma \leq 270°$. If the joint angles $\theta_0$ and $\theta_1$ are defined according to the Denavit-Hartenberg convention and if the manipulator is to be as compact as possible, these ranges of the spring deflection $\gamma$ result in offset angles $\beta_0=-180°$ and $\delta_1\approx -180°$. Friction becomes more significant at smaller size scales; therefore, to reduce steady-state positioning errors due to friction in the joints the springs should have as high a stiffness as possible. In addition, higher manipulator applied forces (pushing and gripping) are desirable; therefore, the wrist magnet and finger magnet should have as large a magnetic moment (volume) as possible.

B. Design Process

The first step in the design process was to choose the desired shape of the torque curve for each spring; that is, to choose $\overline{R}$, $\varphi_A$, and $\varphi_B$. The wrist spring (joint 0) needed to have a stable equilibrium at $\gamma=180°$ ($\theta_0=0°$) and a nearly constant stiffness so that it returns to its resting joint angle of $\theta_0=0°$ when the actuating magnetic field is removed. The finger spring (joint 1) needed to have an unstable equilibrium at approximately $\gamma=240°$ ($\theta_0\sim 600°$) so that it experiences a bistable transition between open $\theta_1=90°$ and closed $\theta_1=0°$ positions.

Figure 3:
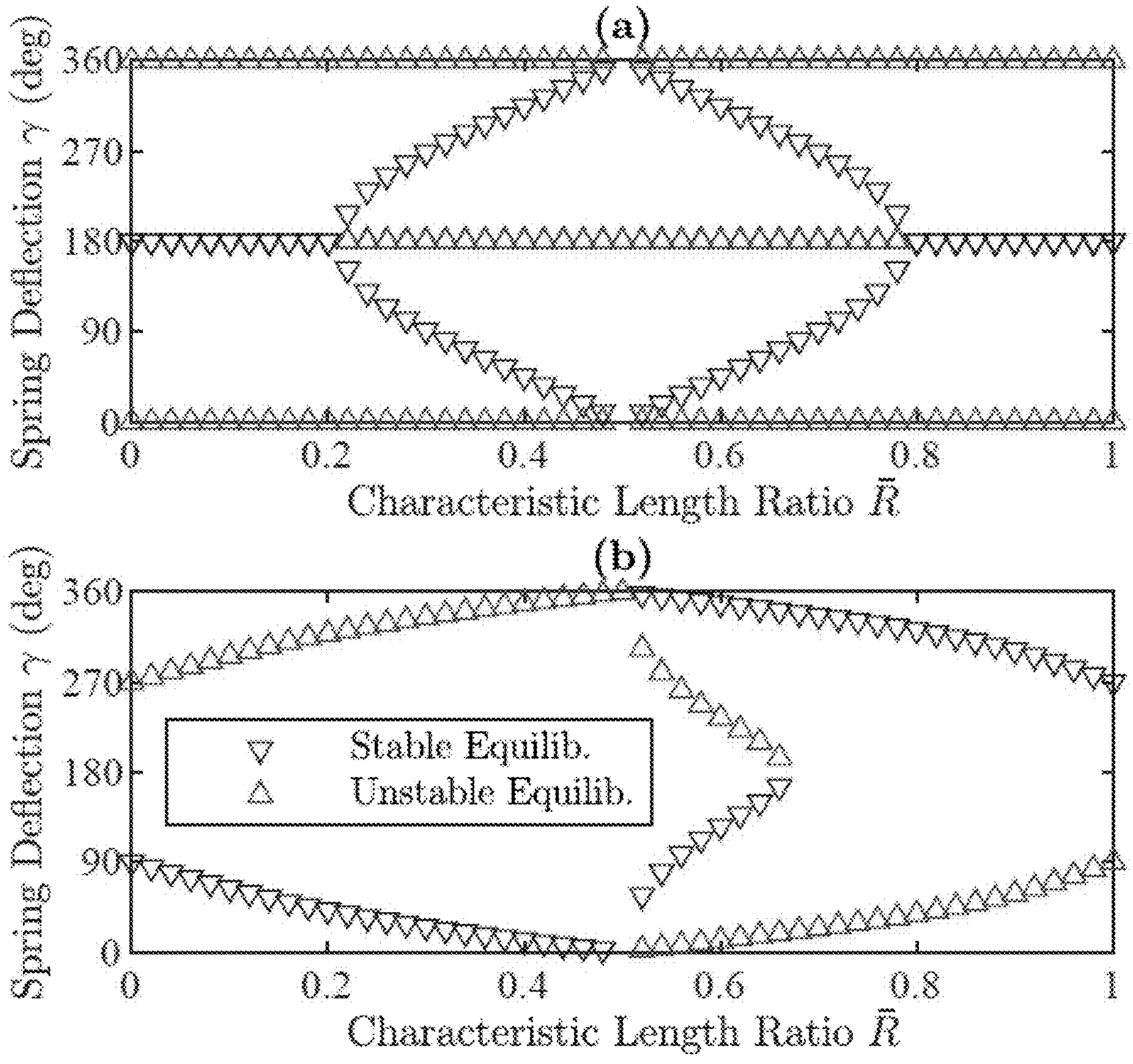
FIG. 3 illustrates points of equilibrium as a function of the length ratio for (a) the wrist spring $\varphi_A$=180° and $\varphi_B$=0° and (b) the finger spring $\varphi_A$=180° and $\varphi_B$=90°.

To choose the values of $\varphi_A$ and $\varphi_B$, the points of equilibrium for a magnetic torsion spring for a given value of $\varphi_A$ and $\varphi_B$ were determined using the analytical model and plotted for different values of $\overline{R}$ as shown in FIGS. 3 (*a*) and (*b*). For the wrist spring, $\varphi_B=0°$ was known from the constraints, but $\varphi_A$ needed to be determined. After plotting the equilibrium points for many different values of $\varphi_A$, it was found that the only values that returned stable equilibrium points at $\gamma=180°$ were $\varphi_A=0°$ or $\varphi_A=180°$. However, the range of stability was larger and the linearity was better for the equilibrium points with $\varphi_A=180°$; therefore, $\varphi_A=180°$ was selected for the wrist spring. For the finger spring, $\varphi_A=180°$ and (Pt 90° were known from the constraints.

The range of acceptable values for $\overline{R}$ was determined from FIGS. 3 (*a*) and (*b*) for the wrist and finger springs, respectively. For the wrist spring, $0 \leq \overline{R} \leq 0.2$ and $0.8 \leq \overline{R} \leq 1.0$ gave stable equilibrium points at $\gamma=180°$; however, if $m_B$ is to be as large as possible to ensure high applied forces, values of $0.8 \leq \overline{R} \leq 1.0$ would be easier to manufacture. For the finger spring, the range of acceptable values was more restrictive: approximately $0.58 \leq \overline{R} \leq 0.62$.

Figure 4:
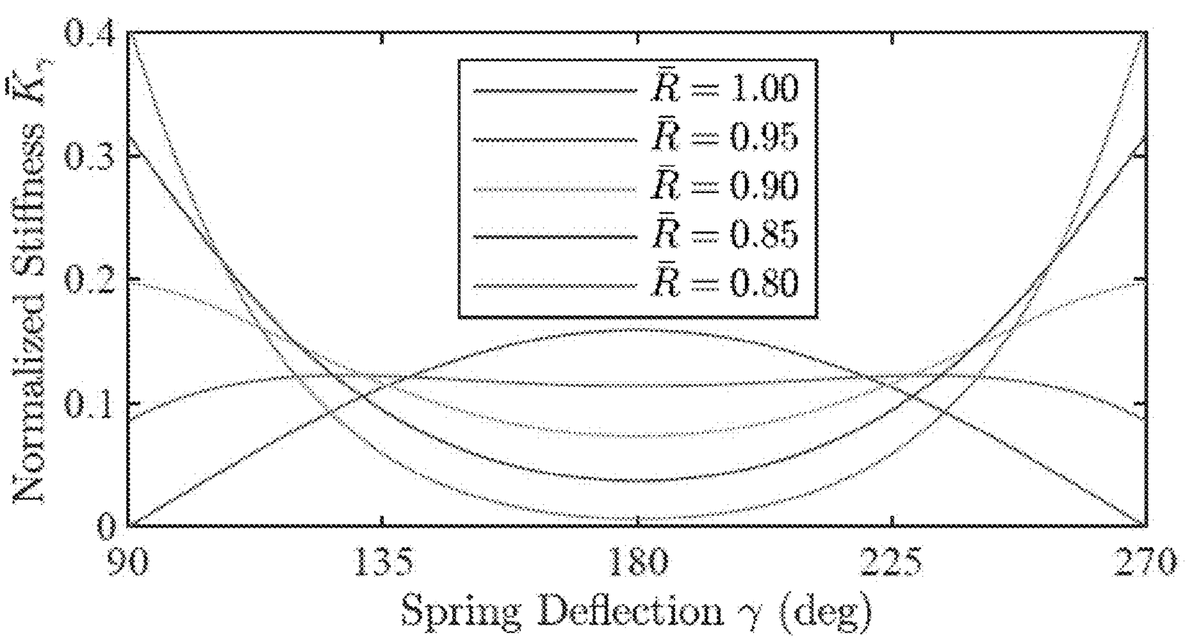
FIG. 4 illustrates normalized (unitless) stiffness versus deflection angle for different values of $\bar{R}$ with $\varphi_A$=180° and $\varphi_B$=0°.

Selecting an exact value of $\overline{R}$ within the range of acceptable values for the wrist spring required a closer look at the stiffness behavior in FIG. 4. A value of $\overline{R}$ near 0.95 was chosen because it had the least variation in stiffness over the operating deflection range. Further tuning resulted in a final selected value of $\overline{R}=0.94$ for the wrist spring.

Figure 5:
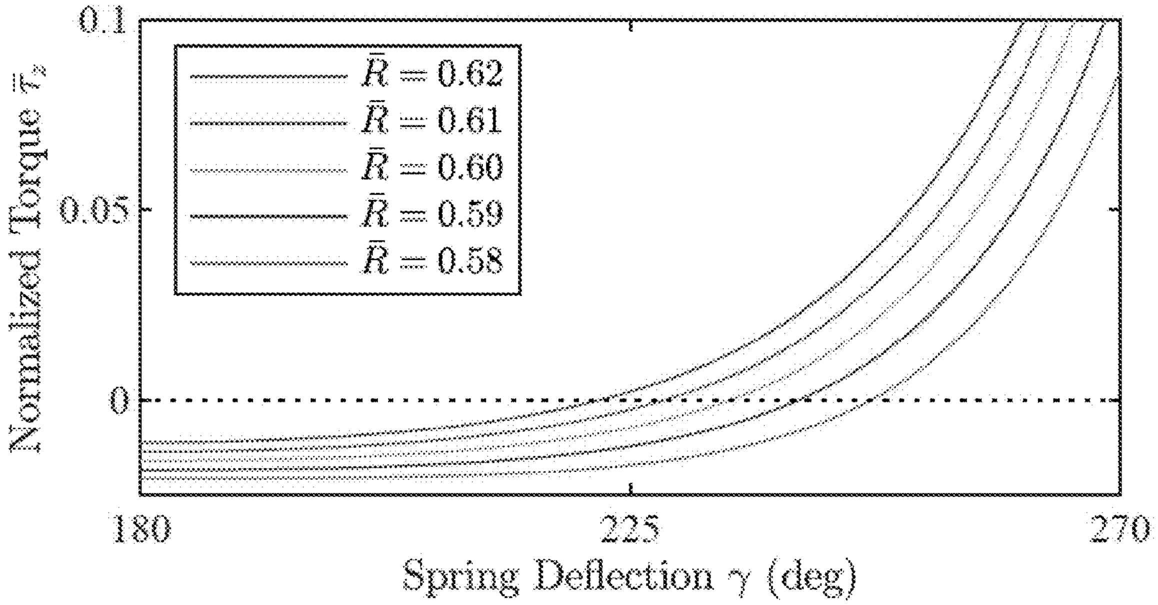
FIG. 5 illustrates normalized (unitless) torque versus deflection angle for different values of $\bar{R}$ with $\varphi_A$=180° and $\varphi_B$=90°.

To select an exact value of $\overline{R}$ within the range of acceptable values for the finger spring, its torque-deflection behaviour was examined in FIG. 5. Higher values of $\overline{R}$ move the unstable equilibrium point lower and provide higher torque at the lower limit of the operating deflection range (closed state) while lower values of $\overline{R}$ provide higher stiffness at the unstable equilibrium point and higher torque at the upper limit of the operating deflection range (open state). A value of $\hat{R}=0.59$ was chosen because it yielded a reasonable trade-off between higher stiffness at equilibrium and higher torque in the closed state.

The remaining three parameters $r_A+r_B$, $m_A$, and $m_B$ needed to be selected to determine the magnitude of the torque, stiffness, and sensitivity for the springs. For the wrist magnet, a 3.175 mm diameter by 3.175 mm length cylindrical magnet was chosen for $m_1$ ($m_B$ for the wrist and $m_A$ for the finger) to maximize the strength of the robot while satisfying the size constraint. Choosing the magnitude of $m_0$ and the distance $r_A+r_B$ for the wrist spring required manual tuning to find an acceptable mean magnetic sensitivity (140 rad/T) and mean stiffness ($2.11\times10^{-4}$ N·m/rad) over the operating range. A similar manual tuning process was performed to choose the magnitude of $m_2$ and the distance $r_A+r_B$ for the finger spring, resulting in a magnetic sensitivity of 65 rad/T and a stiffness of $1.94\times10^{-4}$ N·m/rad at the equilibrium point.

C. Final Selected Design Parameters

The results of the design process are shown in Table 1:

TABLE 1

Summary of selected design parameters.

| Parameter | Wrist Joint | Finger Joint |
|---|---|---|
| $\beta$ | **−180.0°** | **−189.5°** |
| $\varphi_A$ (deg) | 180.0° | **180.0°** |
| $\varphi_B$ (deg) | **0.0°** | **80.5°** |
| $\bar{R}$ (—) | 0.94 | 0.59 |
| $r_A$ (mm) | 0.254 | 3.302 |
| $r_B$ (mm) | 3.969 | 4.849 |
| $m_A$ (mA · m²) | 3.7 | 29.6 |
| $m_B$ (mA · m²) | 29.6 | 12.6 |

The values given in bold were determined directly from the design constraints. The manipulator components were fabricated using a FormLabs Form 2 Desktop SLA 3D printer with FormLabs Clear v4 resin at a resolution of 25 μm. A D11-N52 cylindrical magnet (D=1.588 mm, H=1.588 mm), a D22-N52 cylindrical magnet (D=3.175 mm, H=3.175 mm), and three B111 cubic magnets (L=1.588 mm each) from K&J Magnetics were used for $m_0$, $m_1$, and $m_2$ respectively. A photograph of the robot is shown in FIG. 1 (*a*) and the CAD model of the robot is shown in FIG. 1 (*b*).

Designing magnetic torsion springs can be an iterative process that may require returning to earlier steps after analyzing the design. The choice of magnetic moment magnitudes was limited by the selection available from magnet parts suppliers, and the distance $r_A+r_B$ was subject to the manufacturing capabilities of the FormLabs Form 2 printer. In order to accommodate the gripping surface of the finger, magnet 2 had to be offset from the centre of the gripper by approximately 0.8 mm, which is why the final design of the finger joint had $\varphi_B=80.5°$.

Numerical and Experimental Validation

Figure 8:
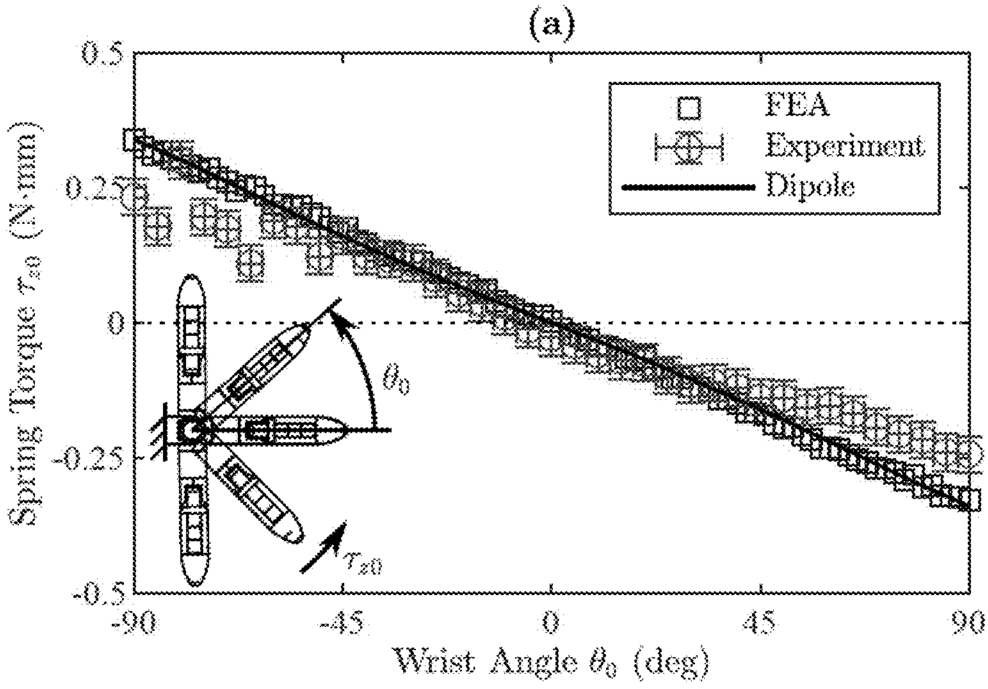
FIG. 8 illustrates a predicted dipole model, FEA numerical model, and scaled experimental measured spring torque versus joint angle for (a) Joint 0 (constant stiffness) and (b) Joint 1 (bistable negative stiffness).
Figure 8:
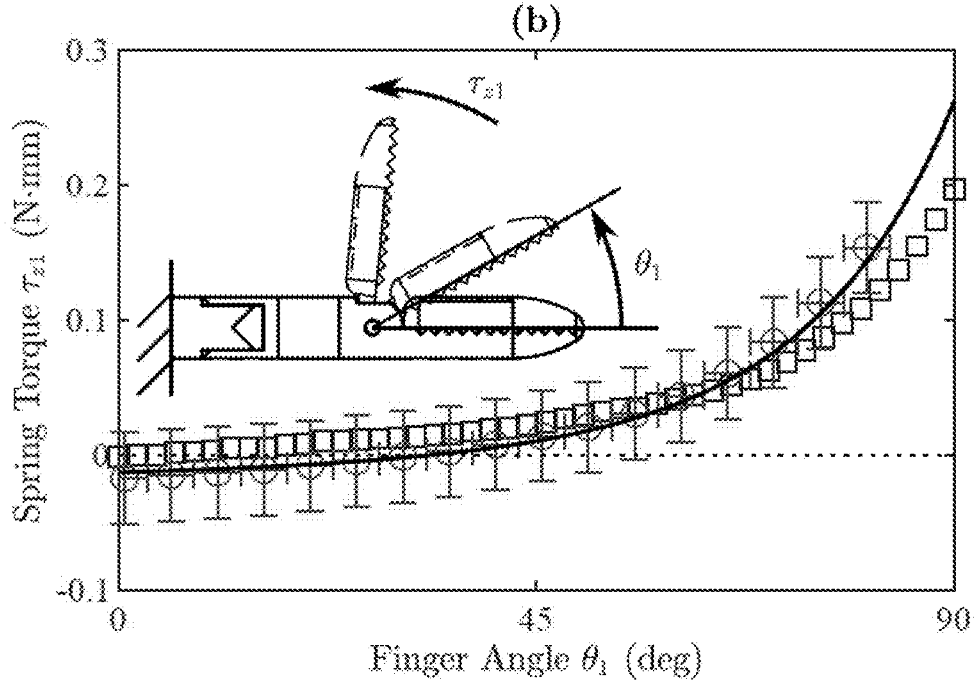

It was necessary to verify the behavior of the magnetic torsion springs, which may differ from the analytical model due to the limitations of the dipole assumption. To accomplish this validation, a magnetic finite element analysis was performed in COMSOL, and experimental measurements of the restoring torque on a scale model of the finger and wrist springs were conducted. The FEA results and experimental measurements are shown in FIG. 8.

A. Finite Element Analysis

Figure 6:
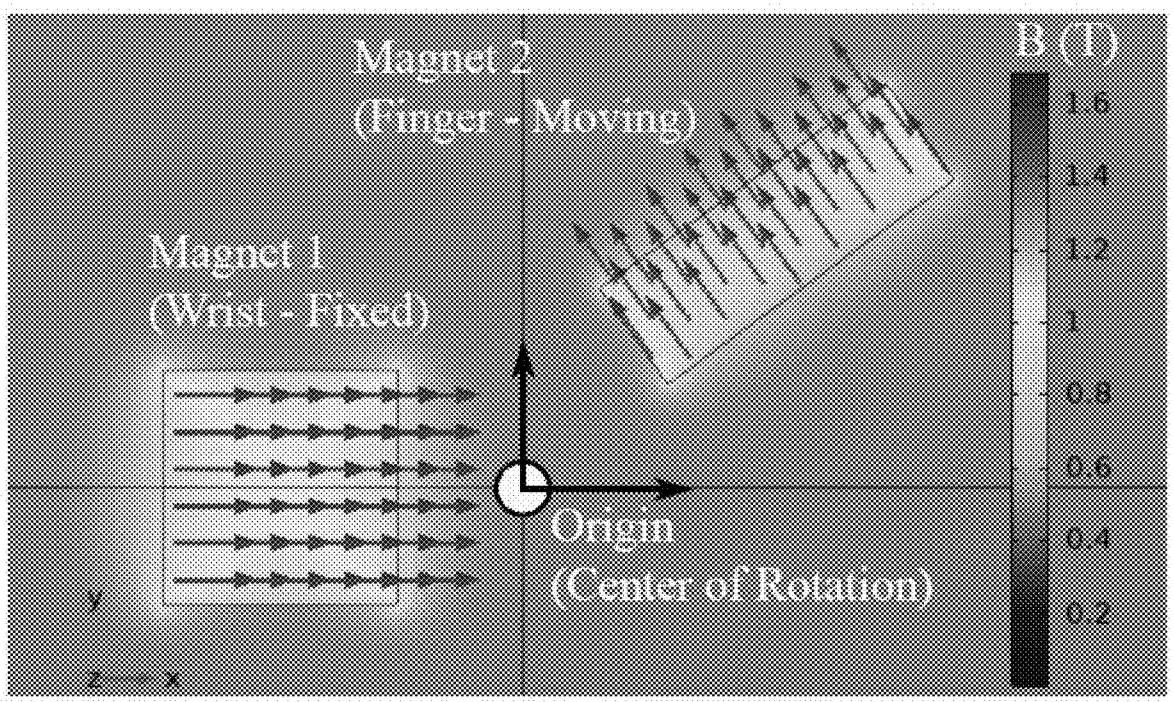
FIG. 6 is an example of FEA in COMSOL showing the finger magnet in a deflected position near the wrist magnet.

A finite element analysis was performed in COMSOL to ensure that the springs behaved similarly to their analytical approximation. Each magnetic torsion spring was simulated separately. The finite element model takes the geometry of the magnets into account, so it should show if the dipole assumption made in the analytical model fails to accurately capture the behavior of the springs. In the simulation for the wrist spring, the base magnet (magnet 0) was held fixed while the wrist magnet (magnet 1) was rotated about the center of rotation in increments of 2° over the operating deflection range ($90°\leq\gamma\leq270°$ or equivalently $-90°\leq\theta_0\leq90°$). Similarly, for the finger spring the wrist magnet (magnet 1) was held fixed while the finger magnet (magnet 2) was rotated about the center of rotation in increments of 2° over the operating deflection range ($189.5°\leq\gamma\leq279.5°$ or equivalently $0°\leq\theta_0\leq90°$). An example of the finger spring FEA is shown in FIG. 6.

B. Experimental Measurements

Figure 7:
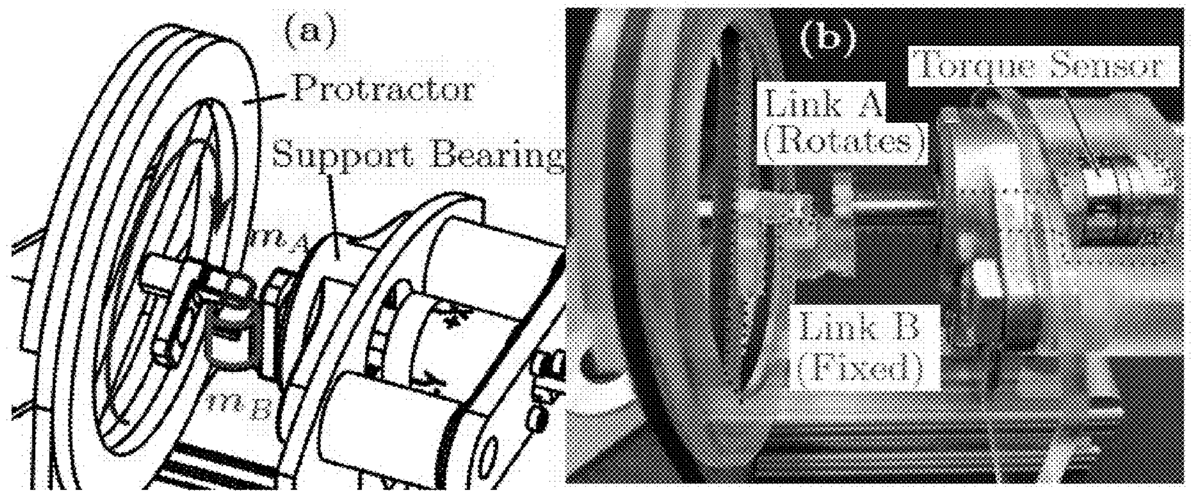
FIG. 7 shows an experimental apparatus for measuring the torque produced by the magnetic torsion spring on link B: (a) CAD model, (b) photograph.

The magnetic spring torque was measured using an ATI Nano17 Titanium 6-axis force-torque transducer with signals acquired through a National Instruments USB-6210 DAQ. The experimental apparatus is pictured in FIG. 7. The torque measurement on link B was performed in a kinematic inversion: link B (the moving link in the model) was held fixed to the force transducer while link A (the fixed link in the model) was rotated around the center of rotation in increments of 5° through the operating deflection range of each spring. There was no physical contact between the links to ensure that the only measured forces were due to magnetic interaction and not friction or contact forces.

The experiments were performed at 200% scale compared to the true robot scale to ensure that the magnetic torques were sufficiently large to be measured accurately by the ATI Nano17T. Consequently, the measured torques in FIG. 8 were scaled by a factor of ⅛ to account for the scaling of $\tau_z\propto L^3$. For the wrist spring, a D22-N52 magnet and a D44-N52 magnet from K&J magnetics were used for $m_0$ and $m_1$ at distances of $r_A=0.51$ mm and $r_B=7.94$ mm, respectively. For the finger spring, a D44-N52 magnet and three B222G-N52 magnet from K&J Magnetics were used for $m_1$ and $m_2$ at distances of $r_A=6.60$ mm and $r_B=9.70$ mm, respectively. The experimental results are shown in FIGS. 8 (*a*) and (*b*) for the wrist spring and finger spring, respectively.

C. Control Demonstration

As a final demonstration of the success of the magnetic torsion spring design, the robot was placed inside of a 3-axis Helmholtz coil system capable of producing 20 mT fields in three dimensions at frequencies up to 50 Hz. A simple open-loop control algorithm was used to test the operation of the robot. The robot was capable of turning and gripping independently. The gripper would rapidly transition between its open and closed positions, and it would remain stable in each position even in the absence of opening/closing applied fields. The unstable equilibrium point of the finger was measured by slowly displacing the finger until it snapped to its other stable position and was found to occur at $\theta_1=47°\pm5°$.

The results in FIG. 8 (*a*) show excellent agreement between the analytical model and the FEA model in predicting the wrist spring torque. The experimental results show reasonable agreement in that the torque is very nearly linear, but the linear best-fit stiffness for the experimental results is 25% lower than the stiffness predicted by the analytical and FEA models. It is possible that tolerances in the construction of the experimental apparatus resulted in a slightly larger spacing between the magnets than intended. Due to the cubic effect of distance $r_A+r_B$ on the stiffness, a misalignment of only 0.5 mm could account for the 25% change in stiffness. Future investigations of magnetic springs will require more precise apparatus construction.

The results in FIG. 8 (*b*) show reasonable agreement between the analytical model and the FEA model in predicting the finger spring torque for large values of $d_1$ (when the magnets are close together) but slightly worse agreement for small values of $\theta_1$ (when the magnets are farther apart). The worse agreement may be due to the relatively small torques being affected by the numerical precision of the FEA simulation. Conversely, the experimental results show excellent agreement with the analytical model, though the FEA model is well within the range of uncertainty of the experimental measurements. The close agreement between experimental results and theory was unexpected because magnets with higher aspect ratios (like the finger magnet) tend to be poorly represented by the dipole assumption.

Overall, the qualitative behavior of the magnetic robot as it was actuated in a magnetic field was indicative of a successful design. The finger joint exhibited bistability with an unstable equilibrium within the designed region, and the wrist joint responded linearly to increasing fields, which implies a constant-stiffness wrist spring response. However, static friction in the joint proved to be significant enough to result in steady-state errors in response to step inputs.

A magnetic torsion spring according to the present disclosure may be useful for creating miniature magnetic robots, enabling joint actuation via remotely generated magnetic fields while prescribing the spring response of the joint. The spring response has two features: shape and amplitude. The shape refers to factors such as the number and position of the equilibrium points, whether those points are stable or unstable, and whether the torque curve around those points is linear, quadratic, or some arbitrary nonlinear shape. The amplitude refers to the intensity or stiffness of the joint, which is mathematically independent of the shape.

Figure 9:
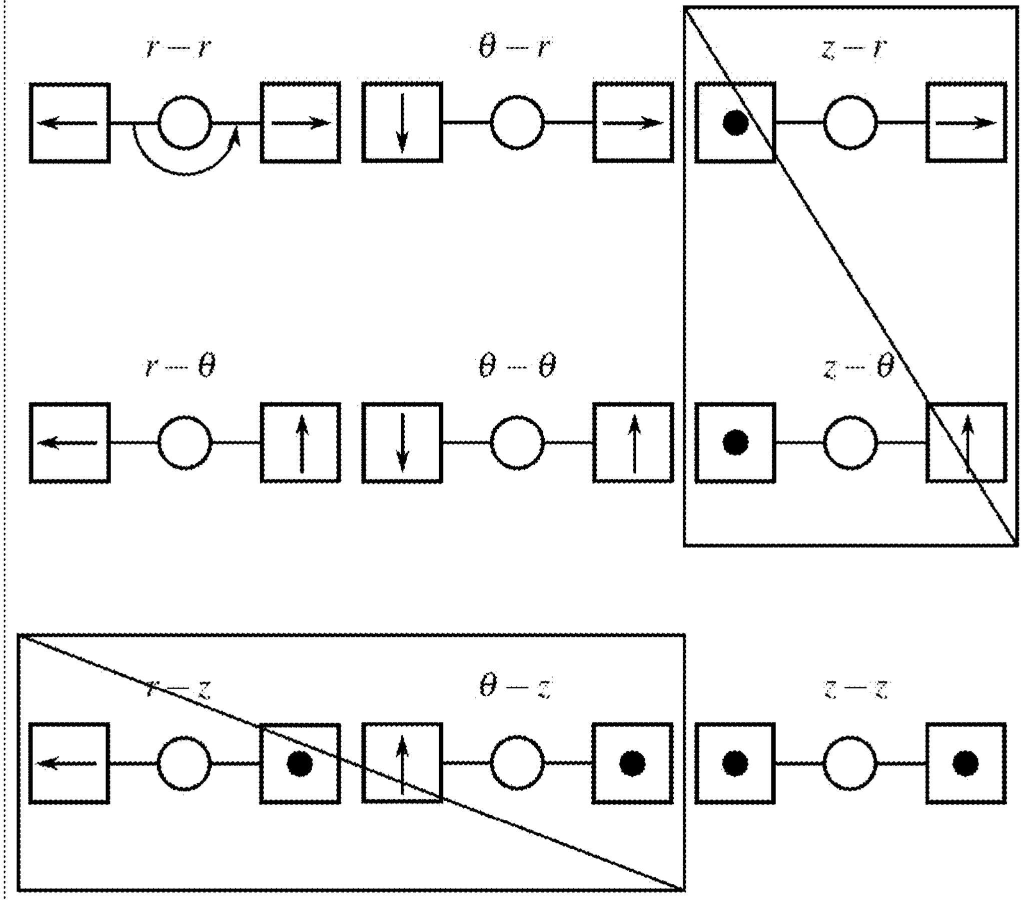
FIG. 9 illustrates nine magnet combination types.

Actuation functionality is determined by the type of combination of two magnets connected by a revolute joint, of which there are nine main types, as shown in FIG. 9 wherein the combinations are labelled according to the direction of each of the magnets relative to the joint axis (r, θ, z) starting with the proximal magnet (the one closer to the base of the robot). Each type responds to magnetic fields in a slightly different way due to the orientation of the distal magnet. The shape of the spring response is determined by both the type and the dimensionless length ratio $\overline{R}$. The amplitude of the spring response is determined entirely by the constant $C=(\mu_0 m_1 m_2)/(r_1+r_2)^3$.

Each magnet can point radially (r), tangentially (θ), or axially (z) for a total of nine combinations. In FIG. 9 the left is the proximal side. The physics of magnetic interaction tell us that the r-z, θ-z, z-r, and z-θ combinations will not produce any restoring torque about the revolute joint, and so these combinations have been crossed out. As a result, we are left with five discrete types that can be termed "spring types" due to the restoring torque behaviour. The selection of positive or negative direction for a given magnet is equivalent to multiplying the entire system response by −1, so having a magnet facing in the opposite direction to the ones in the attached figure should not constitute a separate type.

Figure 10:
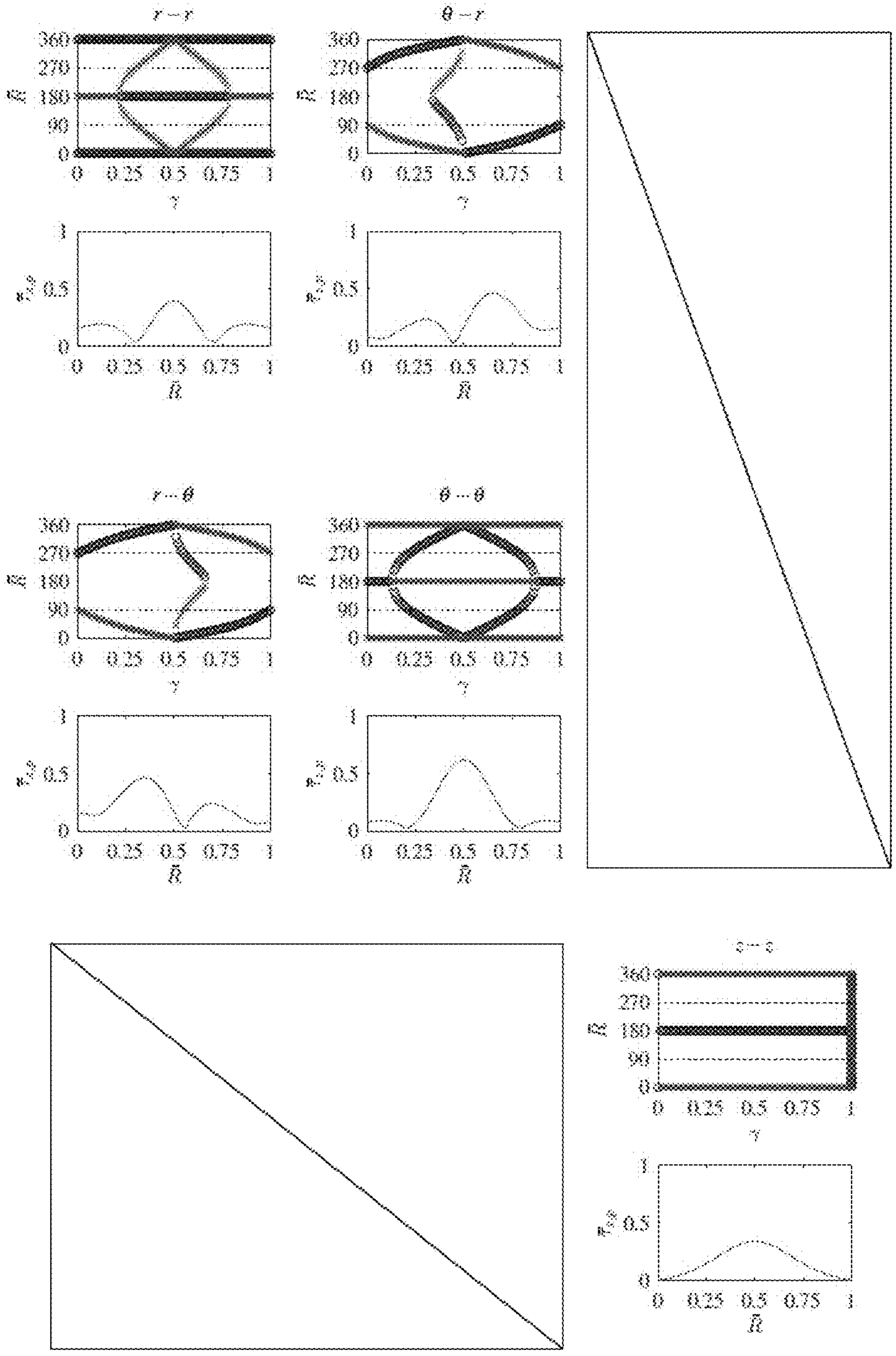
FIG. 10 illustrates magnet combination type behaviours.

The behaviours of the different types is illustrated in FIG. 10, where the positions of the equilibrium points are shown (stable equilibrium indicated by blue circles, unstable by red x's) as a function of the characteristic length ratio $\overline{R}$. One can make the stable equilibrium points unstable and vice versa by flipping the direction of one of the magnets (multiplying by −1). The second subplot for each type shows the peak predicted normalized torque ($\overline{\tau}_{z,p}$) over the range of $\gamma$=90°-270°. The purpose of this subplot is to give an indication of the strength of the spring effect as $\overline{R}$ is changed.

Each of these five spring types has its own properties that makes it unique. For example, the diagonal types (r-r, θ-θ, z-z) yield highly symmetrical responses about 0° and 180°, the off-diagonal types (r-θ, θ-r) give significant asymmetry about those angles, the z-z type is only sensitive to magnetic gradients but has weaker stiffness than the others, the θ-θ type gives a broader range of choices of RBar to achieve 3 stable equilibrium points, and so on.

Multiple magnetic torsion springs according to some embodiments can be connected in series or in parallel to produce mechanisms with more complex behaviours (for example, the serial robot of FIG. 1). In a serial configuration the distal magnet of a preceding magnetic torsion spring serves as the proximal magnet of the next magnetic torsion spring. This chaining ability in the serial configuration further improves the compactness of designs when compared to some prior art magnetic spring designs.

While the prior art designs may be limited to bistable mechanisms with two stable points roughly 180° apart from each other, or a spring constant whose stiffness magnitude can be set but whose stiffness profile (how the stiffness changes as the joint rotates) cannot be controlled precisely, embodiments may provide certain advantages or expanded utility. For example, embodiments may provide bistable mechanisms with two stable points at arbitrary locations, or a spring constant whose stiffness magnitude can potentially be set and whose stiffness profile can potentially be chosen arbitrarily (within certain bounds recognizable and definable by the skilled person). This profile may exhibit one or more of the following: linear increase/decrease in stiffness with respect to rotation angle, about a particular and arbitrary angle, with linearity within a practically usable threshold; constant stiffness with respect to rotation angle; and parabolic stiffness with respect to rotation angle.

The scope of the claims should not be limited by the exemplary embodiments set forth in the foregoing, but should be given the broadest interpretation consistent with the specification as a whole.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A magnetic torsion spring for a magnetically actuated mechanism, the spring comprising:

first and second links of the mechanism rotatably connected at a joint of the mechanism, wherein the first link is provided with a first magnet spaced from the joint and the second link is provided with a second magnet spaced from the joint generating a spring effect;

wherein the spring is defined by a torque curve with respect to spring deflection, the torque curve defined by spring type, dimensionless characteristic length ratio of the spring, and an amplitude constant; and the length ratio has a value between 0 and 1.

2. The magnetic torsion spring of claim 1 wherein the mechanism is a robot.

3. The magnetic torsion spring of claim 1 wherein the mechanism has a size less than or equal to 5 mm.

4. The magnetic torsion spring of claim 1 wherein the spring is wirelessly actuatable by an external magnetic field source.

5. The magnetic torsion spring of claim 1 wherein the spring type is selected from the group consisting of diagonal, off-diagonal, z-z, and θ-θ spring types.

6. The magnetic torsion spring of claim 1 wherein the joint is a revolute joint.

7. The magnetic torsion spring of claim 1 wherein the first and second magnets are uniformly magnetized.

8. The magnetic torsion spring of claim 1 wherein the first and second magnets are configured for use in actuation of the magnetically actuated mechanism.

9. A magnetically actuated mechanism, the mechanism comprising:

a first magnetic torsion spring comprising first and second links of the mechanism rotatably connected at a first joint of the mechanism, wherein the first link is provided with a first magnet spaced from the first joint and the second link is provided with a second magnet spaced from the first joint generating a first spring effect; and a second magnetic torsion spring comprising a third link of the mechanism rotatably connected to the second link at a second joint of the mechanism, wherein the third link is provided with a third magnet spaced from the second joint generating a second spring effect;

wherein each of the springs is defined by a torque curve with respect to spring deflection, the torque curve defined by spring type, dimensionless characteristic length ratio of the spring, and an amplitude constant; and the length ratio has a value between 0 and 1.

10. The magnetically actuated mechanism of claim 9 wherein the mechanism is a robot.

11. The magnetically actuated mechanism of claim 9 wherein the mechanism has a size less than or equal to 5 mm.

12. The magnetically actuated mechanism of claim 9 wherein each of the springs is wirelessly actuatable by an external magnetic field source.

13. The magnetically actuated mechanism of claim 9 wherein the spring type is selected from the group consisting of diagonal, off-diagonal, z-z, and θ-θ spring types.

14. The magnetically actuated mechanism of claim 9 wherein the first joint and the second joint are revolute joints.

15. The magnetically actuated mechanism of claim 9 wherein the first joint has a first joint axis of rotation parallel to a second joint axis of the second joint.

16. The magnetically actuated mechanism of claim 9 wherein the first joint has a first joint axis of rotation non-parallel to a second joint axis of the second joint.

17. The magnetically actuated mechanism of claim 9 wherein the first, second and third magnets are uniformly magnetized.

18. The magnetically actuated mechanism of claim 9 wherein the first, second and third magnets are configured for use in actuation of the magnetically actuated mechanism.

19. A method for forming a magnetic torsion spring having a desired torque-displacement response for a magnetically actuatable mechanism, the spring comprising first and second links of the mechanism rotatably connected at a joint of the mechanism, comprising:

a. providing first and second magnets for positioning on the first and second links, respectively;

b. determining a desired magnetic actuation response;

c. selecting a spring type based on the desired magnetic actuation response;

d. determining a torque curve reflective of the desired torque-displacement response;

e. selecting a dimensionless parameter length ratio to achieve the shape of the desired torque-displacement response;

f. selecting an amplitude constant to achieve an amplitude of the desired torque-displacement response; and g. positioning the first and second magnets on the first and second links, respectively, using the spring geometry, each of the first and second magnets spaced from the joint, and the length ratio having a value between 0 and 1, generating a spring effect.

20. The method of claim 19 wherein the spring type is selected from the group consisting of diagonal, off-diagonal, z-z, and θ-θ spring types.

21. The method of claim 19 wherein the spring is wirelessly actuatable by an external magnetic field source.

22. The method of claim 19 wherein the joint is a revolute joint.

23. The method of claim 19 wherein the first and second magnets are uniformly magnetized.

24. The method of claim 19 wherein the first and second magnets are configured for use in actuation of the magnetically actuatable mechanism.

* * * * *